United States Patent
Takahashi

(10) Patent No.: US 7,586,222 B2
(45) Date of Patent: Sep. 8, 2009

(54) VOLTAGE CONTROLLER FOR ALTERNATOR OF VEHICLE

(75) Inventor: Keiji Takahashi, Hazu-gun (JP)

(73) Assignee: Denso Corporation, Kariya (JP)

(*) Notice: Subject to any disclaimer, the term of this patent is extended or adjusted under 35 U.S.C. 154(b) by 392 days.

(21) Appl. No.: 11/509,690

(22) Filed: Aug. 25, 2006

(65) Prior Publication Data

US 2007/0057584 A1 Mar. 15, 2007

(30) Foreign Application Priority Data

Sep. 9, 2005 (JP) .............................. 2005-261458

(51) Int. Cl.
*H02K 19/36* (2006.01)
*H02K 9/00* (2006.01)
(52) U.S. Cl. ...................................... 310/64; 310/68 R
(58) Field of Classification Search ............... 310/68 D, 310/64
See application file for complete search history.

(56) References Cited

U.S. PATENT DOCUMENTS

| | | | | |
|---|---|---|---|---|
| 3,439,255 A | * | 4/1969 | Carnes et al. ................. | 322/28 |
| 3,573,516 A | * | 4/1971 | Lyon et al. .................. | 310/68 D |
| 4,284,914 A | * | 8/1981 | Hagenlocher et al. ..... | 310/68 D |
| 4,739,204 A | * | 4/1988 | Kitamura et al. .......... | 310/68 D |
| 5,095,235 A | * | 3/1992 | Kitamura .................. | 310/68 D |
| 5,675,205 A | * | 10/1997 | Jacob et al. .................. | 310/239 |
| 5,719,487 A | * | 2/1998 | Sato et al. ...................... | 322/28 |
| 6,020,662 A | * | 2/2000 | Chen et al. .................... | 310/65 |
| 6,081,054 A | * | 6/2000 | Kashihara et al. ......... | 310/68 D |
| 6,705,388 B1 | * | 3/2004 | Sorgo ........................ | 165/80.3 |
| 6,839,236 B2 | | 1/2005 | Yamamoto et al. | |
| 2002/0105242 A1 | | 8/2002 | Takahashi et al. | |

FOREIGN PATENT DOCUMENTS

| | | |
|---|---|---|
| DE | 102 00 665 A1 | 8/2002 |
| JP | A-S55-106063 | 8/1980 |
| JP | A-S56-145759 | 11/1981 |
| JP | 58-33953 * | 2/1983 |
| JP | A-H 05-102356 | 4/1993 |
| JP | A 8-85402 | 4/1996 |
| JP | A 2000-83358 | 3/2000 |
| JP | A 2003-244913 | 8/2003 |

OTHER PUBLICATIONS

Japanese Office Action dated Jun. 9, 2009.

* cited by examiner

*Primary Examiner*—Burton Mullins
(74) *Attorney, Agent, or Firm*—Oliff & Berridge, PLC

(57) ABSTRACT

A voltage controller has a control circuit and a heat radiating member attached to the circuit. The circuit controls a voltage of electric power generated in an alternator of a vehicle while generating heat. The member has a first surface and a second surface. The second surface of the member is formed in a smooth shape having no protrusions or hollows. A cooling wind flows on the second surface. The member receives the heat from the control circuit through the first surface and radiates the heat from the second surface to the wind.

15 Claims, 7 Drawing Sheets

US 7,586,222 B2

VOLTAGE CONTROLLER FOR ALTERNATOR OF VEHICLE

CROSS-REFERENCE TO RELATED APPLICATION

This application is based upon and claims the benefit of priority of the prior Japanese Patent Application 2005-261458 filed on Sep. 9, 2005, so that the contents of which are incorporated herein by reference.

BACKGROUND OF THE INVENTION

1. Field of the Invention

The present invention relates to a voltage controller which controls a voltage of electric power generated from a rotational force in an alternator mounted in a passenger car, a truck or the like.

2. Description of Related Art

A conventional voltage controller used in an alternator for a vehicle has a circuit substrate, a heat radiating fin, and a casing. The fin is adhered to the substrate with a high thermal conductive adhesive. The controller is fixed to a frame of the alternator through a male type connector integrally formed with the casing. Integrated circuit (IC) chips for control circuits, transistors and the like are disposed on the substrate, and heat generated in the chips is transmitted to the fin through the adhesive and is transferred to a cooling wind.

A shape of the fin is designed while considering circumferential conditions of the controller in its operation and flow conditions of the cooling wind. Various shapes of heat radiating fins are, for example, disclosed in Published Japanese Patent First Publications No. H08-85402, No. 2000-83358 and No. 2003-244913.

FIG. 1 is a perspective side view showing a heat radiating fin representing fins disclosed in the Publications. FIG. 2 is a view showing flow directions of a cooling wind colliding with the fin shown in FIG. 1. As shown in FIG. 1, a fin 270 has a plurality of rib-like protrusions 260 disposed at predetermined intervals, and each protrusion 260 stands on a base 265 along a standing direction. A groove is formed on the base 265 between adjacent protrusions 260 in each pair. As shown in FIG. 2, when a cooling wind 280 flows toward the fin 270 in parallel to the standing direction, the wind collides with the fin 270, turns its flow direction and passes through the grooves. Therefore, each groove acts as a wind path, and heat transmitted to the fin 270 is transferred to the wind.

However, because an alternator having a heat radiating fin is mounted in a vehicle, a cooling wind inevitably includes foreign matters such as dust, mud and the like, during the running of the vehicle. Therefore, there is high probability that the foreign matters are packed or deposited in the wind path so as to prevent the wind from passing through the wind path. In this case, a cooling performance in the fin considerably deteriorates, so that the chips are sometimes over-heated and broken. Further, when the fin is manufactured, a complicated work is required to form rib-like protrusions on a fin base. Therefore, it is difficult to manufacture the fin 270 at low cost.

SUMMARY OF THE INVENTION

An object of the present invention is to provide, with due consideration to the drawbacks of the conventional voltage controller, a voltage controller which is stably cooled at a predetermined cooling performance and is manufactured at low cost. Further, the object is to provide an electric rotary machine which is manufactured at low cost while stably cooling a control unit at a predetermined cooling performance.

According to a first aspect of this invention, the object is achieved by the provision of a voltage controller comprising a control circuit and a heat radiating member having a first surface and a second surface. The control circuit controls a voltage of electric power generated in an alternator of a vehicle while generating heat. The second surface of the heat radiating member is formed in a smooth shape. The heat radiating member receives the heat from the control circuit through the first surface and radiates the received heat from the second surface.

Because the member has no protrusions or hollows on the second surface formed in a smooth shape, a cooling wind including foreign matters such as dust, mud and the like can smoothly pass through the second surface without packing or deposition of the foreign matters on the second surface. Accordingly, a cooling performance in the member can be reliably maintained during the running of the vehicle, and the voltage controller can stably be cooled at a predetermined cooling performance. Further, because the member is formed in a simple shape having no protrusions or hollows, the controller can be manufactured at low cost.

According to a second aspect of this invention, the object is achieved by the provision of an electric rotary machine comprising an electromagnetic interaction unit having both a stator and a rotor, a control unit, and a heat radiating member having a first surface and a second surface. The interaction unit electromagnetically induces electric power in the stator from a rotational force of the rotor or electromagnetically converts electric power supplied to the stator to a rotational force of the rotor, and outputs the induced electric power or the converted rotational force. The control unit controls the interaction unit to output the induced electric power or the converted rotational force set at a predetermined value, and generates heat during the control of the interaction unit. The second surface of the heat radiating member is formed in a smooth shape, and the member receives the heat from the control unit through the first surface and radiates the received heat from the second surface.

Accordingly, Because the member has no protrusions or hollows on the second surface formed in a smooth shape, the control unit can stably be cooled at a predetermined cooling performance, and the machine can be manufactured at low cost.

DETAILED DESCRIPTION OF THE PREFERRED EMBODIMENT

An embodiment of the present invention will now be described with reference to the accompanying drawings. However, this embodiment should not be construed as limiting the present invention to a structure of the embodiment, and the structure of this invention may be combined with that based on the prior art.

EMBODIMENT

Figure 1:
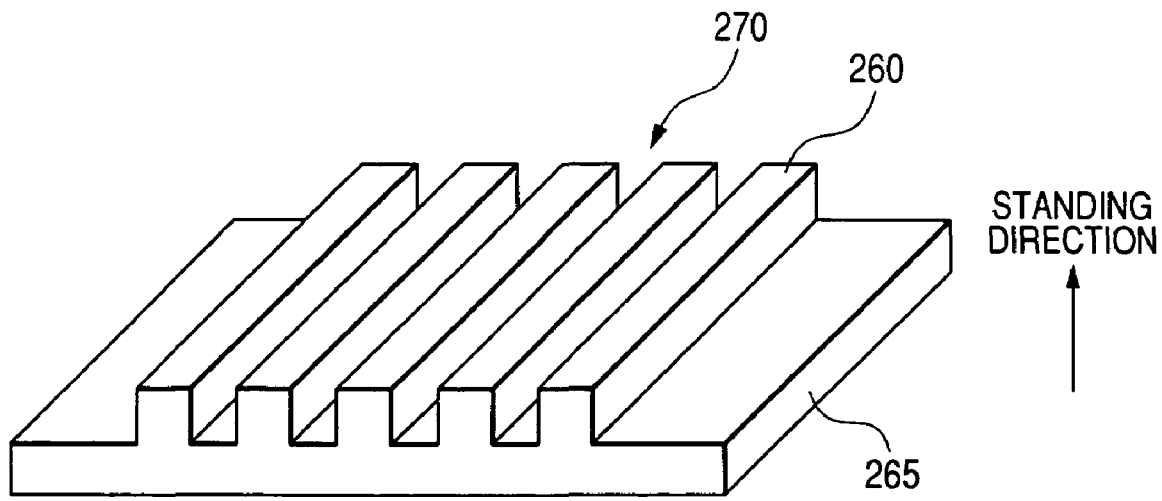
FIG. 1 is a perspective side view showing a conventional heat radiating fin.
Figure 2:
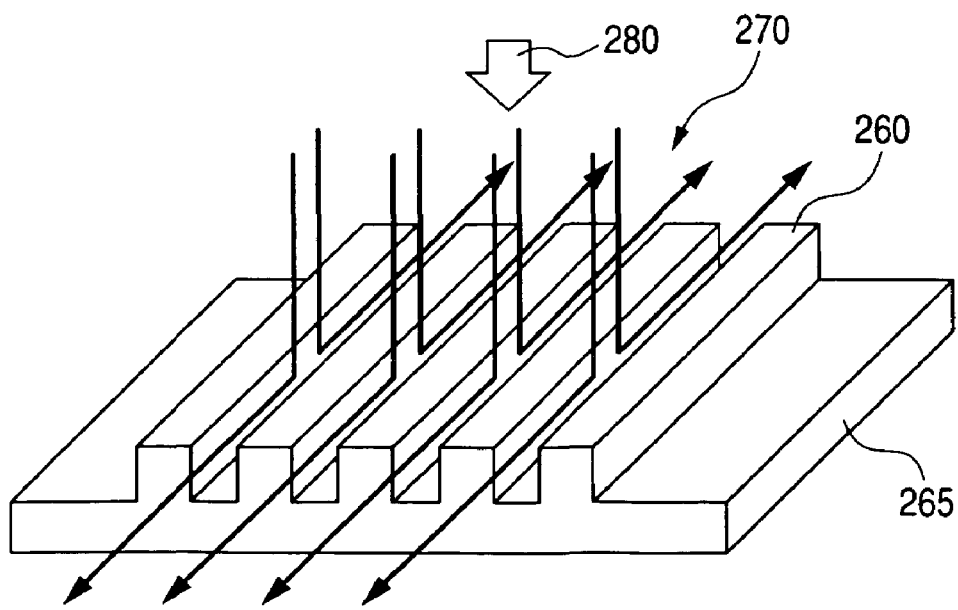
FIG. 2 is a view showing flow directions of a cooling wind colliding with the fin shown in FIG. 1.
Figure 3:
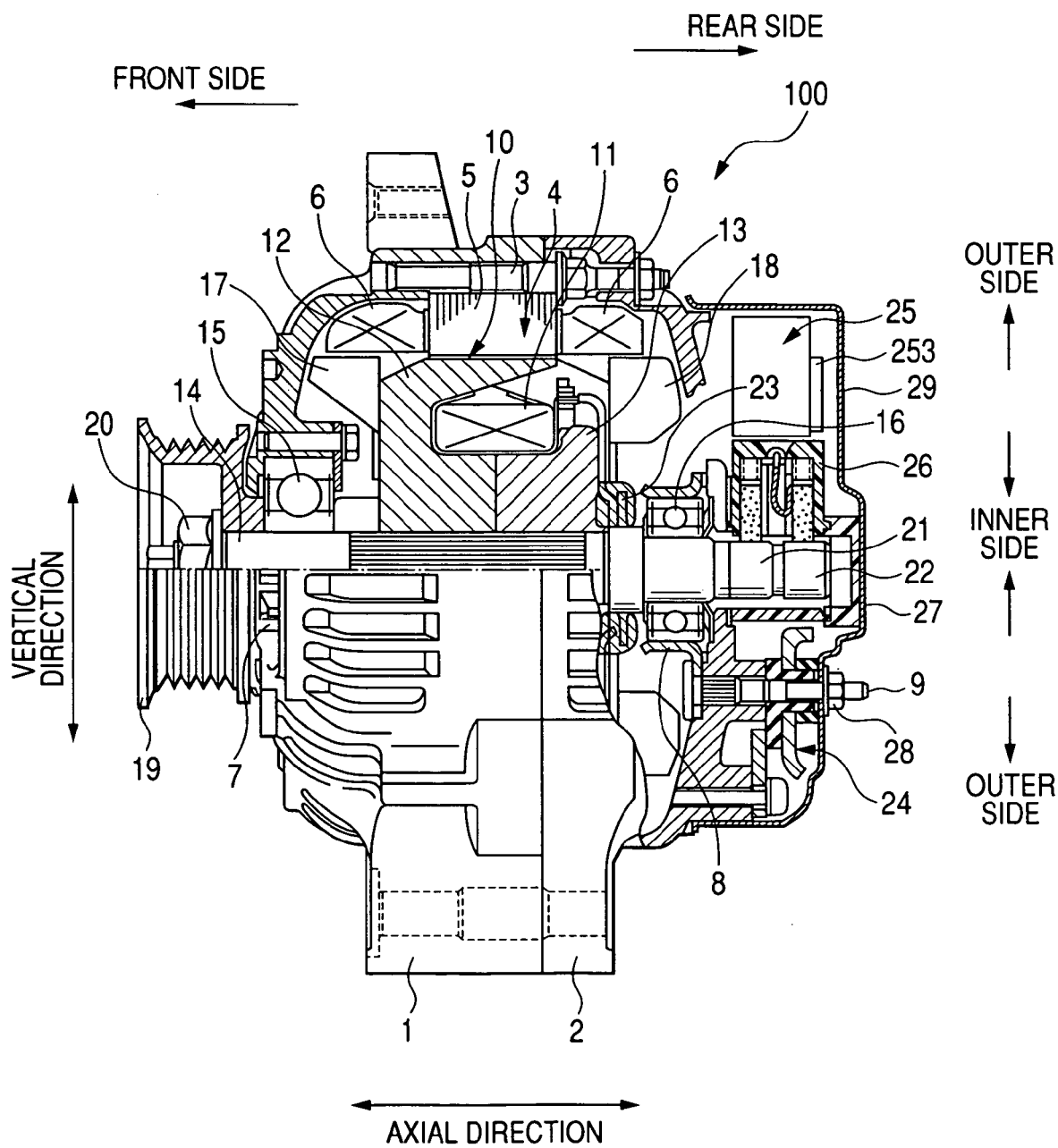
FIG. 3 is a longitudinal sectional view of an alternator for a vehicle according to an embodiment of the present invention.

FIG. 3 is a longitudinal sectional view of an alternator for a vehicle according to an embodiment. As shown in FIG. 1, an alternator 100 mounted in a vehicle has a front side frame 1, a rear side frame 2, a stator 4, a rotor 10, a rectifier 24, a voltage controller 25, a brush apparatus 26, and a rear cover 27 made of a steel plate or resin.

Each of the frames 1 and 2 is formed in a cup shape. These frames 1 and 2 are fixed to each other by a plurality of bolts 3 such that openings of the frames 1 and 2 directly contact with each other so as to form an open space within the frames 1 and 2. A cylindrical bearing box 7 is integrally formed with the frame 1, and an iron-made bearing box 8 is fixed to the frame 2 by a bolt 9 having a knurling portion.

The rotor 10 has field windings 11, pole cores 12 and 13 surrounding the windings 11, a shaft 14 extending along an axial direction of the alternator and is rotatably held by a pair of bearings 15 and 16 fixed to the bearing boxes 7 and 8. The stator 4 is disposed on an outer side of the rotor 10 in radial directions of the alternator and is fixed to an inner circumferential surface of the frame 1. Each radial direction is directed from a rotation axis of the rotor 10 to an arbitrary point on a plane perpendicular to the axial direction. The stator 4 has a stator core 5 and stator windings 6 corresponding to three phases.

To generate cooling wind, centrifugal type cooling fans 17 and 18 are attached to the rotor 10. The fan 17 is fixed to an end surface of the pole core 12 on a front side of the alternator in the axial direction. The fan 18 is fixed to an end surface of the pole core 13 on a rear side of the alternator in the axial direction. To direct a cooling wind toward the field windings 11, the fan 17 is of a mixed flow type. That is, the fan 17 has blades aligned along a circumferential direction of the rotor 10 and inclined toward a rotational direction of the rotor 10.

A pulley 19 is coupled to a front end of the shaft 14 by a nut 20 and is rotated and driven in response to a rotational force generated in a vehicle engine (not shown). A pair of slip rings 21 and 22 is provided on a rear end of the shaft 14 placed outside the frame 2 and is electrically connected with the field windings 11 through a conductor 23.

Electric parts of the alternator such as the rectifier 24, the voltage controller 25 and the brush apparatus 26 are placed outside the frame 2 and are fixed by the bolt 9 to an end surface of the frame 2 in the axial direction. The rectifier 24 rectifies a three-phase alternating current voltage of electric power generated in the stator windings 6 to a direct current voltage. The voltage controller 25 adjusts an exciting current flowing through the field windings 11 so as to control the voltage obtained in the rectifier 24. The brush apparatus 26 is provided with brushes pressed to the slip rings 21 and 22 and causes the exciting current to flow from the rectifier 24 to the field windings 11.

The electric parts attached to the frame 2 and placed outside the frame 2 are covered with the cover 27 such that the electric parts are placed between the frame 2 and the cover 27. The cover 27 is fixed to the frame 2 by the combination of the bolt 9 extending from the frame 2 and a nut 28 fastened to the bolt 9. The cover 27 has a plurality of air intake windows 29 coaxially formed near the brush apparatus 26.

When a rotational force is transmitted from a vehicle engine to the pulley 19 through a belt or the like, the rotor 10 is rotated on its rotation axis. When an exciting current of an exciting voltage is supplied from the outside to the field windings 11 of the rotor 10 through the brush apparatus 26 during the rotation of the rotor 10, respective nail portions of the pole cores 12 and 13 are magnetically excited. Therefore, a three-phase alternating current voltage is electro-magnetically induced in the stator windings 6. The induced voltage is converted into a direct current voltage in the rectifier 24, and a direct current of the converted voltage is outputted from an output terminal of the rectifier 24. The voltage controller 25 receives a control signal based on the output voltage and adjusts the exciting current flowing through the field windings 11 according to the control signal so as to control the voltage obtained in the rectifier 24 at a desired value. Therefore, electric power of the voltage controlled by the controller 25 is outputted.

Further, each of the fans 17 and 18 is rotated with the rotor 10 so as to generate a cooling wind. In response to the rotation of the fan 18, air is taken from the windows 29 of the cover 27 into the alternator 100 as a cooling wind, and the wind flows from the rear side to the front side along the axial direction. Therefore, the rectifier 24, the voltage controller 25 and the brush apparatus 26 placed between the cover 27 and the frame 2 are cooled by this wind.

Figure 4:
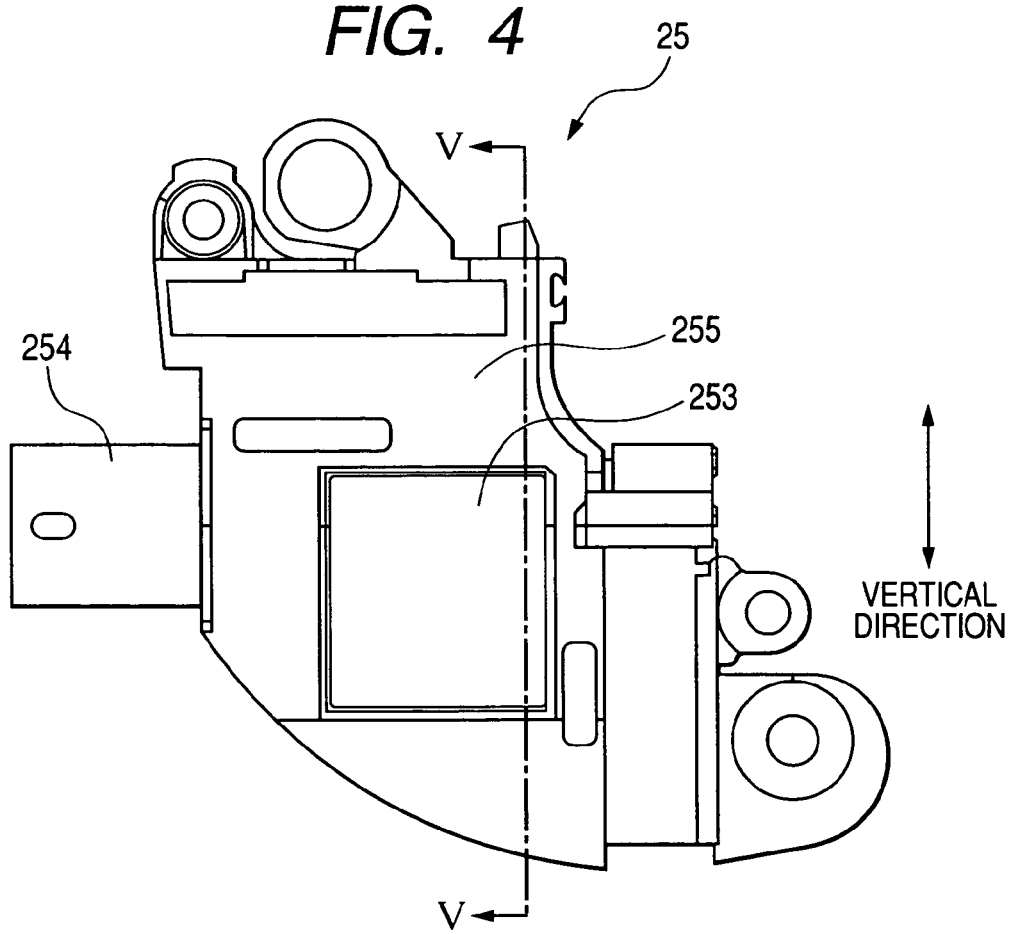
FIG. 4 is a side view of a voltage controller of the alternator shown in FIG. 3.
Figure 5:
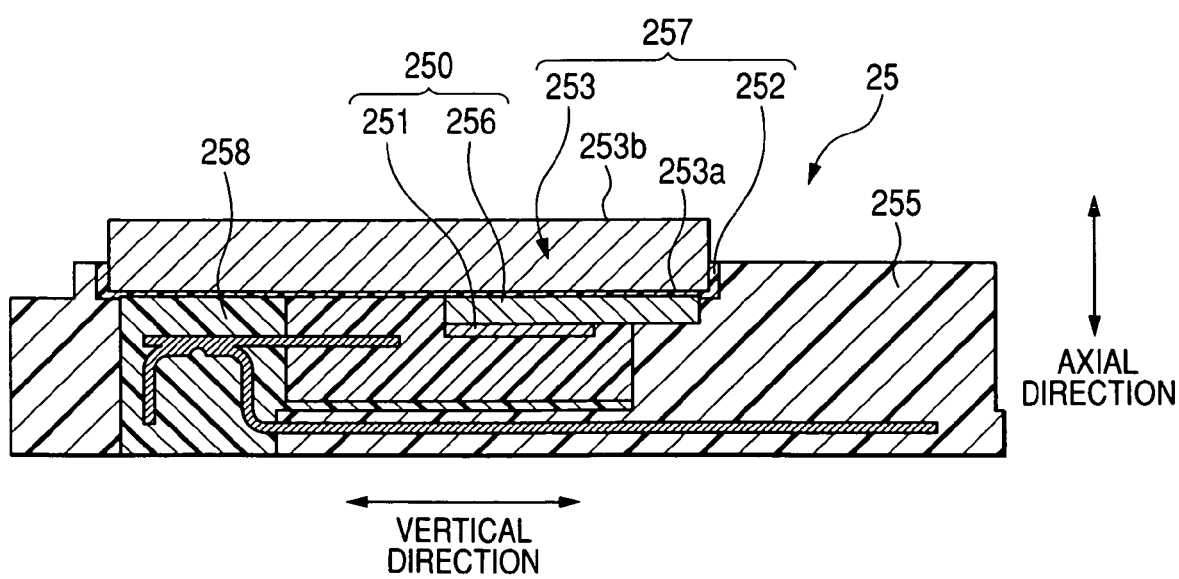
FIG. 5 is a sectional view taken substantially along line V-V of FIG. 4.

Next, the voltage controller 25 is described in detail. FIG. 4 is a side view of the voltage controller 25. FIG. 5 is a sectional view taken substantially along line V-V of FIG. 4.

As shown in FIGS. 4 and 5, the voltage controller 25 has a control circuit 250 and a heat radiating member 257 attached to the circuit 250. The circuit 250 has a semiconductor substrate 256 and an IC chip 251 disposed on the substrate 256. The member 257 has a heat radiating plate 253 made of metal such as aluminum and a high thermal conductive adhesive 252 through which the plate 253 is attached to the substrate 256. The plate 253 is manufactured by pressing and shaping an aluminum plate. The controller 25 may further have a casing 255 integrally formed with a male connector 254. The casing 255 seals the circuit 250 with a sealing resin portion 258 to fix the circuit 250 in the controller 25. The controller 25 is attached to the frame 2 through the connector 254.

The chip 251 has an exciting current control circuit and various kinds of abnormality detecting circuits. The control circuit repeatedly starts and stops the exciting current to control an output voltage of the alternator 100. The chip 251 generates heat during the operation of its circuits. To reduce an amount of heat generated in the chip 251 and to downsize the circuits of the chip 251, it is preferred that at least the exciting current control circuit be structured by using metal oxide semiconductor field effect transistors (MOS-FETs).

The plate 253 has a back surface 253a and a heat radiating surface 253b opposite to each other. The back surface contacts with the substrate 256 of the circuit 250 via the adhesive 252. The heat radiating surface 253b is exposed to the atmosphere so as to radiate heat generated in the chip 251 to the atmosphere. The heat radiating surface 253b is formed in a smooth shape such as a curved shape or a flat shape having no protrusions (or ridges) or hollows (or bumps). In case of the curved shape, a curvature of the surface 253b may be constant or be gradually changed such that the surface 253b has no roughness. In case of the flat surface as shown in FIG. 5, the surface 253b may be formed in a quadrangular shape having four sides. The surface 253b is preferably formed in a rectangular shape wherein two sides opposite to each other in each of two sets are parallel to each other. The controller 25 is disposed in the alternator 100 such that the surface 253b of the plate 253 is extended along a vertical direction to be substantially perpendicular to the axial direction. Therefore, the surface 253b of the plate 253 extends along any of the radial directions, and one of the radial directions is directed to a center of gravity of the surface 253b. This radial direction directed to the gravity center of the surface 253b is called a reference radial direction in this specification.

An amount of heat generated in the rectifier 24 is generally larger than that in the chip 251. Therefore, the arrangement of the alternator 100 is determined such that the rectifier 24 is cooled by a cooling wind more effectively than other electric parts placed inside the rear cover 27. In this embodiment, the member 257 and the circuit 250 of the controller 25 are disposed so as to be adjacent to the rectifier 24 along a circumferential direction of the rotor 10. Therefore, even though a cooling wind is concentrated into an area surrounding the rectifier 24, a large amount of cooling wind cools the plate 253 simultaneously with cooling of the rectifier 24. Therefore, heat generated in the chip 251 can be efficiently radiated to the atmosphere.

Figure 6:
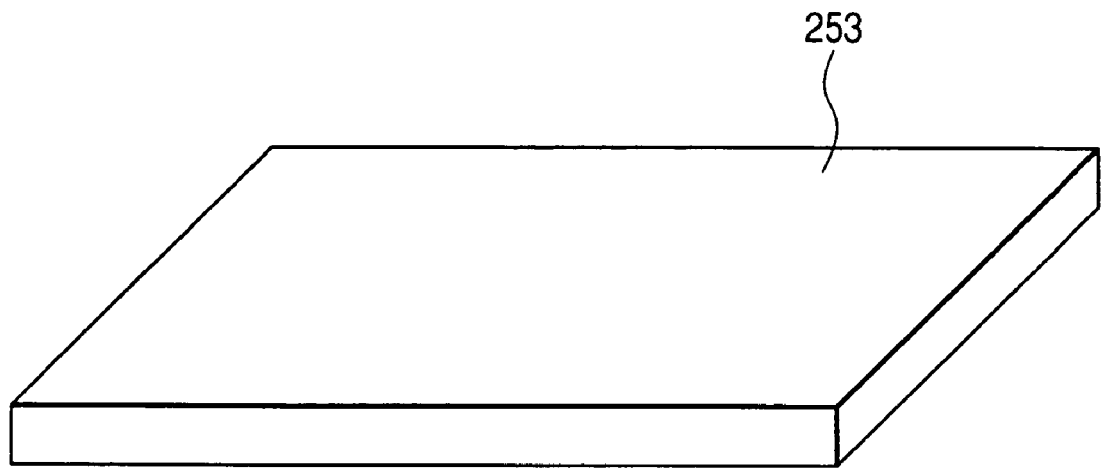
FIG. 6 is a perspective enlarged side view of a heat radiating plate of the controller shown in FIG. 4.
Figure 7:
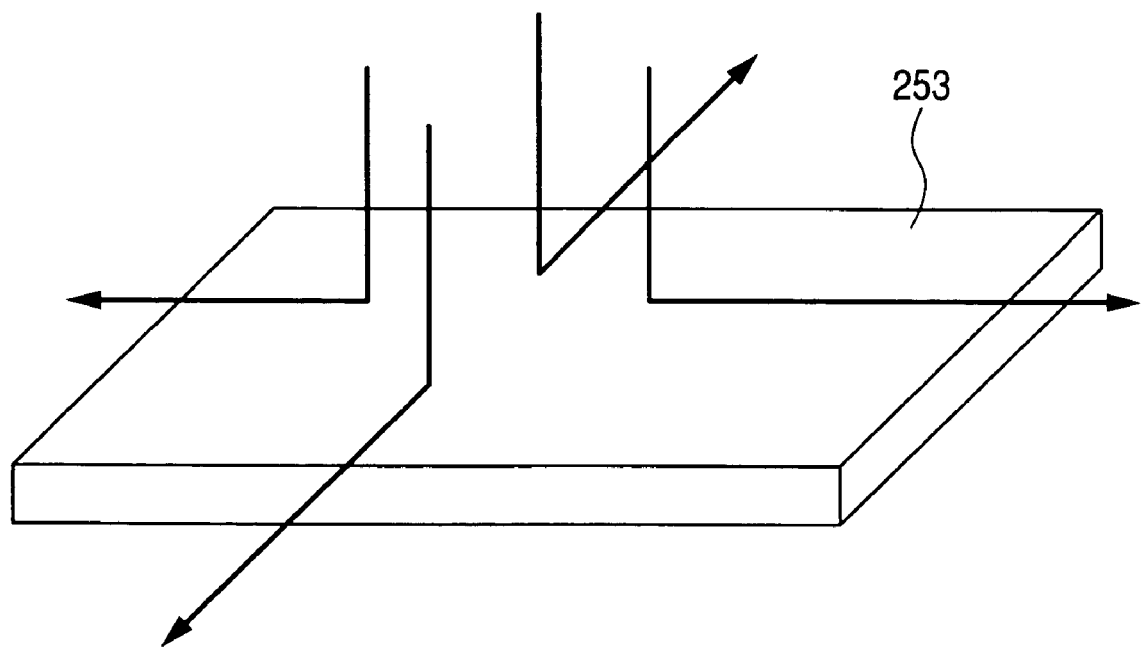
FIG. 7 is an explanatory view showing flow directions of a cooling wind colliding with the plate shown in FIG. 6.

FIG. 6 is a perspective enlarged side view of the plate 253, while FIG. 7 is an explanatory view showing flow directions of a cooling wind colliding with the plate 253. In case of the prior art shown in FIG. 1, the fin 270 is cooled by causing a cooling wind to flow only along a longitudinal direction of the protrusions 260. In contrast, in this embodiment, as shown in FIG. 6 and FIG. 7, a cooling wind generated by the fan 18 flows substantially along the axial direction and collides with the surface 253b of the plate 253. Because the plate 253 is formed in a flat shape having no protrusions or hollows, flow directions of the wind colliding with the plate 253 are not limited, and the wind can flow along any directions in the range of 360 degrees on the surface 253b. In the actual flow of the wind, because the wind is taken into from the windows 29 placed on the outer side, the wind flowing along the axial direction is biased so as to flow from the outer side to the inner side.

Therefore, because the surface 253b of the plate 253 is formed in a flat shape having no protrusions or hollows, the plate 253 can prevent foreign matters such as dust, mud and the like mixed with the wind from being deposited on the surface 253b. Further, even though the foreign matters are temporarily attached to the surface 253b, the foreign matters immediately fall toward a lower direction.

Accordingly, even though the wind including foreign matters flows on the surface 253b, the cooling performance in the controller 25 can be reliably maintained. Further, because the plate 253 has no rib-shaped portions and is formed in a simple shape, the controller 25 can be manufactured at low cost.

Figure 8:
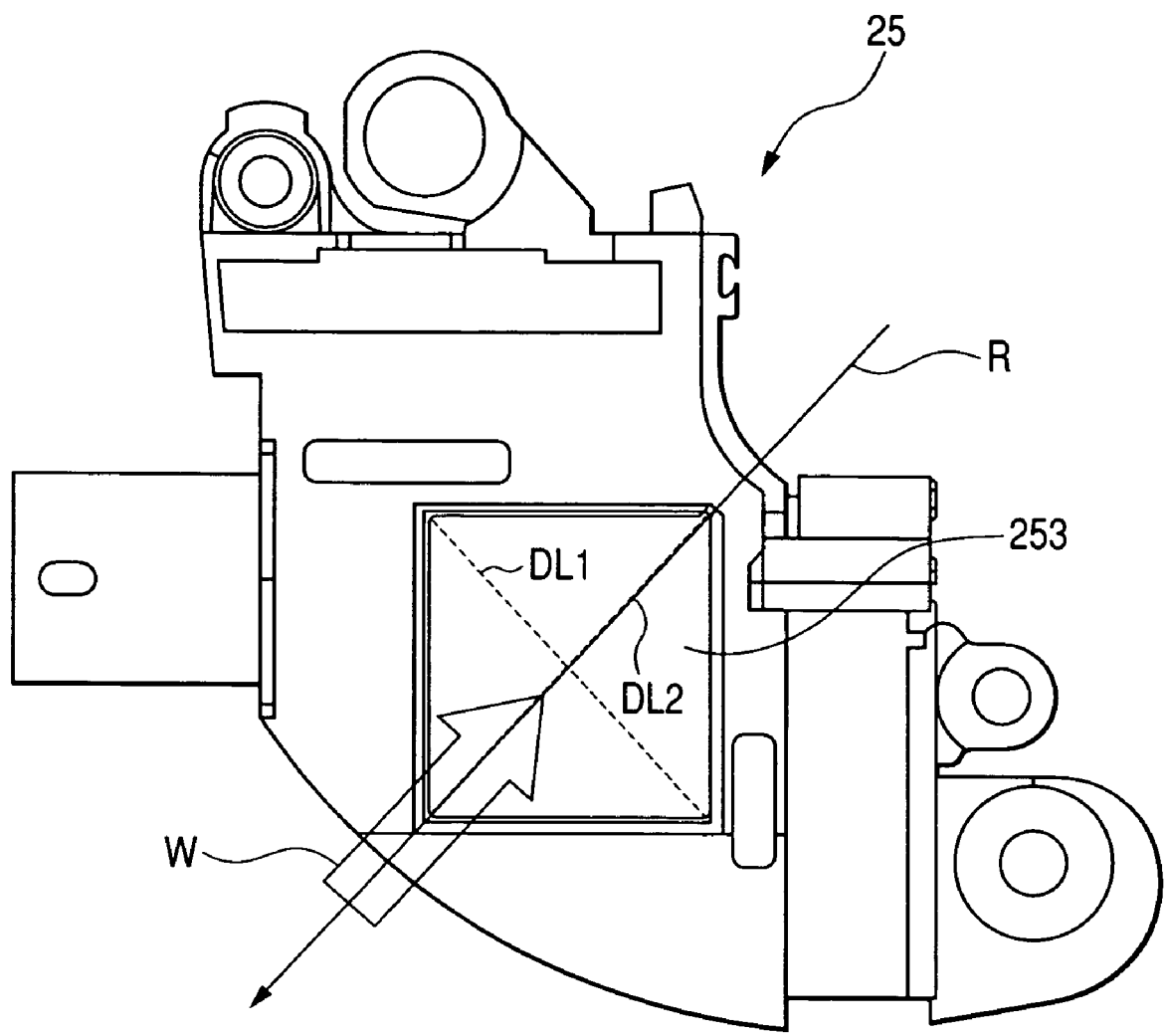
FIG. 8 is an explanatory view showing a cooling wind flowing through the plate.
Figure 9:
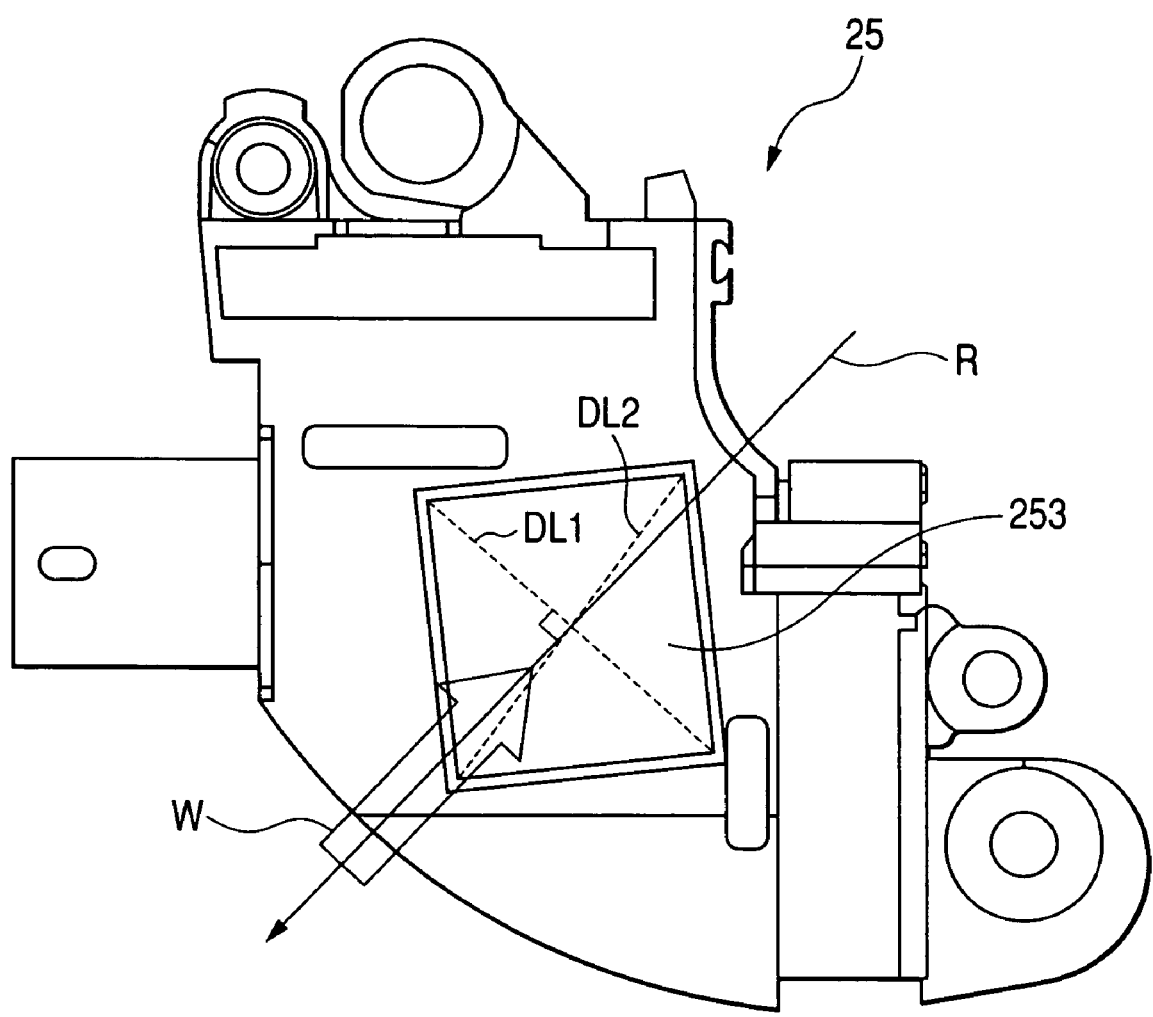
FIG. 9 is another explanatory view showing a cooling wind flowing through the plate.

FIG. 8 is an explanatory view showing a cooling wind flowing through the plate 253, and FIG. 9 is another explanatory view showing a cooling wind flowing through the plate 253. As shown in FIG. 8, in this embodiment, to enhance a cooling performance in the controller 25, the plate 253 having the surface 253b of a rectangular shape may be disposed such that each of four sides in the rectangular shape of the surface 253b is not parallel to the reference radial direction R directing to the gravity center of the surface 253b. In other words, each side may be inclined with respect to the reference radial direction R. More specifically, the plate 253 may be disposed such that one of diagonal lines DL1 and DL2 in the rectangular shape of the surface 253b extends along the reference radial direction R. Alternatively, As shown in FIG. 9, the plate 253 may be disposed such that one of diagonal lines DL1 and DL2 in the rectangular shape of the surface 253b is perpendicular to the reference radial direction R. Therefore, as compared with a case where the plate 253 is disposed such that two opposite sides in the rectangular shape of the surface 253b is parallel to the reference radial direction R, the arrangement based on this embodiment lengthens a length of the surface 253b along a width direction perpendicular to the reference radial direction R on a plane of the surface 253b, and an average length of the surface 253b along the reference radial direction R is shortened.

The reasoning that the arrangement of the plate 253 shown in FIG. 8 and FIG. 9 enhances a cooling performance in the controller 25 is described. As described above, a cooling wind W for cooling the controller 25 is biased so as to flow from the outer side to the inner side. Therefore, a flow direction of the wind W on a plane perpendicular to the rotational axis is opposite to the reference radial direction. When the wind W flows through a surface of the plate 253, the temperature of the wind is generally heightened as the wind flows from an upper stream side to a lower stream side. Therefore, a cooling efficiency at the upper stream side is higher than that at the lower stream side. In other words, as the length of a surface having a fixed area is shortened along a flow direction of the wind W and is lengthened along a direction perpendicular to the flow direction, an average temperature of the wind W passing on the surface 253b is lowered. Further, because the wind W is produced from air taken from the windows 29 sufficiently opened along the width direction, the wind W has a density constant over the whole length of the surface 253b along the width direction. Accordingly, an average temperature of the wind passing on the surface 253b can be reliably lowered, and the cooling performance can be further improved.

Figure 10:
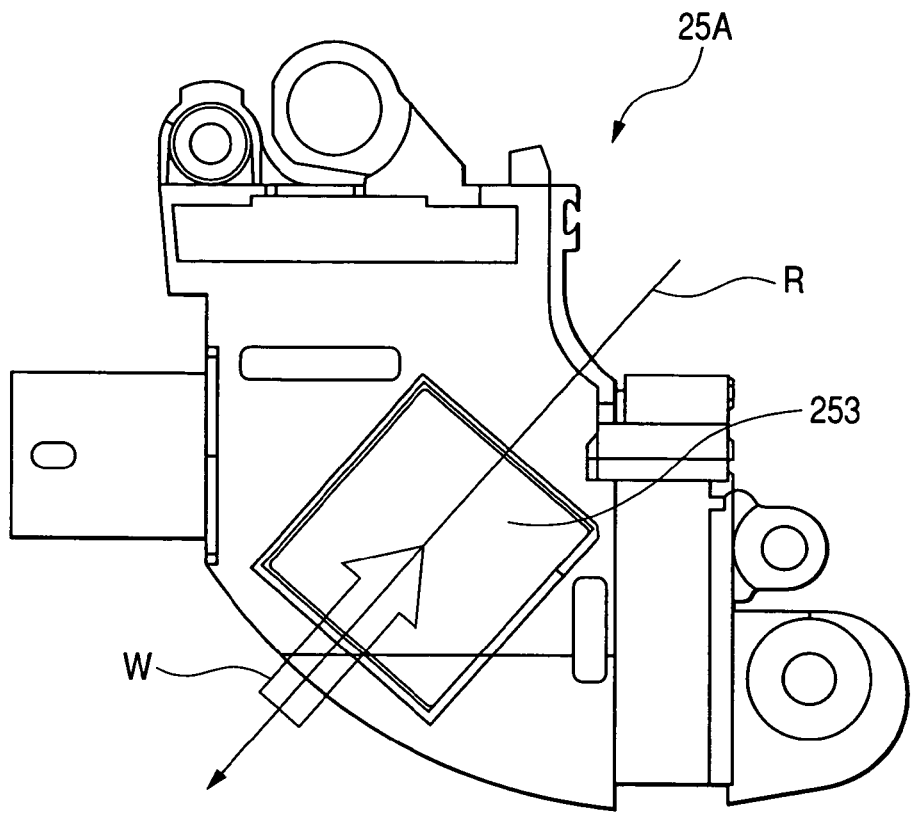
FIG. 10 is a side view of another voltage controller according to a first modification of the embodiment.

FIG. 10 is a side view of a voltage controller according to a first modification of the embodiment.

As shown in FIG. 10, a voltage controller 25A according to a first modification differs from the controller 25 shown in FIG. 4 in that the plate 253 is shifted along a clockwise direction on an upper surface of the casing 255. More specifically, the plate 253 may be disposed such that two opposite sides in the rectangular shape of the surface 253b are parallel to the reference radial direction R. Because the surface 253b of the plate 253 is formed in a flat shape having no protrusions or hollows, the plate 253 can prevent foreign matters such as dust, mud and the like from being deposited on the surface 253b. Accordingly, a cooling performance in the controller 25A can be reliably maintained.

Figure 11:
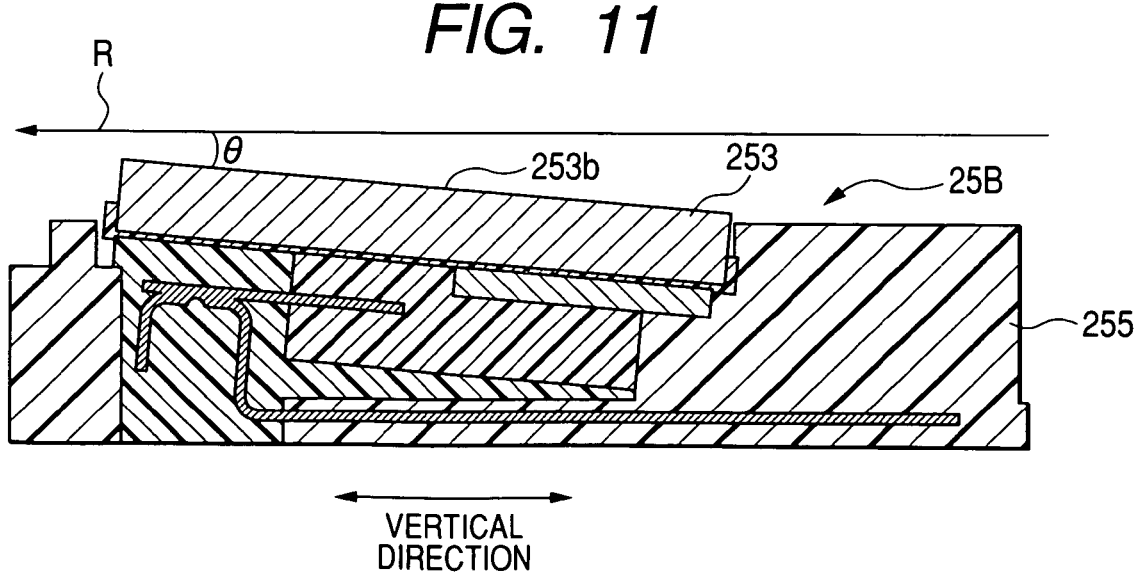
FIG. 11 is a longitudinal sectional view of another voltage controller according to a second modification of the embodiment.

FIG. 11 is a longitudinal sectional view of a voltage controller according to a second modification of the embodiment.

As shown in FIG. 11, a voltage controller 25B according to a second modification differs from the controller 25 shown in FIG. 4 in that the plate 253 is inclined with respect to an upper surface of the casing 255. More specifically, the plate 253 may be disposed such that a plane including the surface 253b intersects with a line extending along the reference radial direction R at a predetermined angle θ. That is, the surface 253b is inclined with respect to the vertical direction.

It is preferred that this angle θ is set to be higher than 0 degree and equal to or smaller than 45 degrees so as to cause the wind colliding with the surface 253b to reliably flow along a direction opposite to the reference radial direction R toward the rectifier 24 and the brush apparatus 26. The cooling performance of the plate 253 can generally be maximized when the cooling wind collides with the surface 253*b* of the plate 253 at an angle almost perpendicular to the surface 253*b*. However, in this case, because a degree of disturbing the flow of the wind is increased, the cooling performance of the whole alternator 100 is lowered. Accordingly, when a degree of disturbing the flow of the cooling wind is lowered by setting an intersecting angle (inclined angle) of the surface 253*b* at an angle equal to or lower than 45 degrees, the cooling performance in the alternator 100 can be improved while the cooling performance in the controller 25B is substantially maintained.

The present invention is not limited to the embodiment and modifications, and various modifications of the embodiment are possible within the scope of the present invention.

For example, in the embodiment and modifications described above, the surface 253*b* of the plate 253 is formed in the rectangular shape. However, the surface 253*b* may be formed in the quadrangular shape having four sides. In this case, the plate 253 is preferably disposed such that a shorter one of diagonal lines in the quadrangular shape of the heat radiating surface extends along the reference radial direction R. Alternatively, the plate 253 is preferably disposed such that a longer one of diagonal lines in the rectangular shape of the heat radiating surface is perpendicular to the reference radial direction R.

Further, as a combination of the embodiment and the second modification, when a plane including the heat radiating surface intersects with a line extending along the reference radial direction R, the plate 253 is preferably disposed such that each of the sides of the quadrangular shape is inclined with respect to a reference direction directing from an intersection of the rotation axis of the rotor 10 and a plane including the heat radiating surface to the gravity center of the heat radiating surface.

Moreover, the member 257 is disposed in the alternator 100. However, a heat radiating member having the same configuration and function as those of the member 257 may be disposed in an electric rotary machine so as to radiate heat generated in a control unit to the atmosphere. In this machine, an electromagnetic interaction unit has the stator 4 and the rotor 10. This unit electromagnetically induces electric power in the stator from a rotational force of the rotor or electromagnetically converts electric power supplied to the stator to a rotational force of the rotor and outputs the induced electric power or the converted rotational force. The control unit controls the electromagnetic interaction unit to output the induced electric power or the converted rotational force set at a predetermined value, and generates heat during the control of the electromagnetic interaction unit. Accordingly, the member in the machine can stably cool the control unit, and the machine having the member can be manufactured at low cost, in the same manner as the controller 25 of the alternator 100.

What is claimed is:

1. A voltage controller, comprising:
a control circuit that controls a voltage of electric power generated in an alternator of a vehicle while generating heat; and
a heat radiating member, having a first surface and a second surface, that receives the heat generated from the control circuit through the first surface and radiates the received heat from the second surface,
wherein the second surface of the heat radiating member has a smooth and flat shape, and
wherein the heat radiating member is disposed such that a plane including the second surface intersects, at an angle greater than zero degrees, with a line along a radial direction that is perpendicular to a rotation axis of a rotor of the alternator and the line directs from the rotation axis to a center of the second surface of the heat radiating member.

2. The voltage controller according to claim 1, wherein the second surface of the heat radiating member has a quadrangular shape having a plurality of sides, and the heat radiating member is disposed such that each of the sides of the quadrangular shape is inclined with respect to a reference direction directing from an intersection of the rotation axis of the rotor of the alternator and the plane including the second surface to the center of the second surface.

3. The voltage controller according to claim 2, wherein the heat radiating member is disposed such that one of diagonal lines of the quadrangular shape is substantially perpendicular to the reference direction.

4. The voltage controller according to claim 2, wherein the heat radiating member is disposed such that one of diagonal lines of the second surface extends along the reference direction.

5. The voltage controller according to claim 1, wherein an intersecting angle of the plane including the second surface to the line along the radial direction is equal to or smaller than 45 degrees.

6. The voltage controller according to claim 1, wherein the second surface of the heat radiating member has a quadrangular shape having a plurality of sides, the heat radiating member is disposed such that the second surface extends along a reference radial direction that is perpendicular to the rotation axis of the rotor of the alternator and the reference radial direction directs from the rotation axis to the center of the second surface of the heat radiating member, and the heat radiating member is disposed such that each of the sides of the quadrangular shape is inclined with respect to the reference radial direction.

7. The voltage controller according to claim 6, wherein the heat radiating member is disposed such that one of diagonal lines of the quadrangular shape is substantially perpendicular to the reference radial direction.

8. The voltage controller according to claim 6, wherein the heat radiating member is disposed such that one of diagonal lines of the second surface extends along the reference radial direction.

9. The voltage controller according to claim 1, further comprising:
a casing which seals the control circuit with a sealing resin so as to fix the control circuit to the sealing resin.

10. The voltage controller according to claim 1, wherein the second surface of the heat radiating member is inclined with respect to a direction perpendicular to the rotation axis of the rotor.

11. An electric rotary machine, comprising:
an electromagnetic interaction unit, having a stator and a rotor, that electromagnetically induces electric power in the stator from a rotational force of the rotor or electromagnetically converts electric power supplied to the stator to a rotational force of the rotor and outputs the induced electric power or the converted rotational force;
a control unit that controls the electromagnetic interaction unit to output the induced electric power or the converted rotational force set at a predetermined value, and generates heat during the control of the electromagnetic interaction unit; and a heat radiating member, having a first surface and a second surface, that receives the heat generated from the control unit through the first surface and radiates the received heat from the second surface, wherein the second surface of the heat radiating member has a smooth and flat shape, and wherein the heat radiating member is disposed such that a plane including the second surface intersects, at an angle greater than zero degrees, with a line along a radial direction that is perpendicular to a rotation axis of a rotor of the alternator and the line directs from the rotation axis to a center of the second surface of the heat radiating member.

12. The machine according to claim 11, further comprising:

an air window through which air is taken into the machine as a cooling wind flowing substantially along an axial direction of the rotor of the electromagnetic interaction unit such that the cooling wind collides with the second surface of the heat radiating member.

13. The voltage controller according to claim 11, wherein the second surface of the heat radiating member has a quadrangular shape having a plurality of sides, and the heat radiating member is disposed such that each of the sides of the quadrangular shape is inclined with respect to a reference direction directing from an intersection of the rotation axis of the rotor and the plane including the second surface to the center of the second surface.

14. The voltage controller according to claim 11, wherein an intersecting angle of the plane including the second surface to the line along the radial direction is equal to or smaller than 45 degrees.

15. The voltage controller according to claim 11, wherein the second surface of the heat radiating member is inclined with respect to a direction perpendicular to the rotation axis of the rotor.

* * * * *